United States Patent [19]

Janik et al.

[11] Patent Number: 5,084,170

[45] Date of Patent: * Jan. 28, 1992

[54] FUEL FILTER

[75] Inventors: Leon P. Janik, Suffield; M. Craig Maxwell, Colchester, both of Conn.

[73] Assignee: Stanadyne Automotive Corp., Windsor, Conn.

[*] Notice: The portion of the term of this patent subsequent to May 2, 2008 has been disclaimed.

[21] Appl. No.: 572,040

[22] Filed: Aug. 23, 1990

Related U.S. Application Data

[63] Continuation-in-part of Ser. No. 404,849, Sep. 8, 1989, Pat. No. 5,017,285, which is a continuation-in-part of Ser. No. 372,645, Jun. 28, 1989, Pat. No. 4,976,852.

[51] Int. Cl.$^5$ .................... B01D 27/08; B01D 27/14
[52] U.S. Cl. .................... 210/232; 210/436; 210/438; 210/450; 210/493.2; 210/299; 210/315; 210/316
[58] Field of Search ........ 210/232, 238, 299, 312–316, 210/436, 438, 440, 450, 454, 493.2, DIG. 5, DIG. 7

[56] References Cited

U.S. PATENT DOCUMENTS

| | | | |
|---|---|---|---|
| 2,134,413 | 10/1938 | Munoz | 210/166 |
| 2,355,373 | 8/1944 | Hankison | 183/32 |
| 2,365,149 | 12/1944 | Anderson | 210/139 |
| 3,056,503 | 10/1962 | Roosa | 210/436 |
| 3,095,370 | 6/1963 | Krogman | 210/133 |
| 3,144,407 | 8/1964 | Olmos | 210/307 |
| 3,158,571 | 11/1964 | Supinger | 210/314 |
| 3,283,904 | 11/1966 | Buckman et al. | 210/132 |
| 3,312,350 | 4/1967 | Kasten | 210/307 |
| 3,390,778 | 7/1968 | Uhen | 210/314 |
| 3,465,883 | 9/1969 | Jumper | 210/307 |
| 3,586,171 | 6/1971 | Offer | 210/136 |
| 3,975,273 | 8/1976 | Shaltz et al. | 210/74 |
| 4,094,791 | 6/1978 | Conrad | 210/316 |
| 4,259,097 | 3/1981 | Patel et al. | 55/316 |
| 4,372,847 | 2/1983 | Lewis | 210/86 |
| 4,465,595 | 8/1984 | Cooper | 210/238 |
| 4,491,120 | 1/1985 | Hodgkins | 210/186 |
| 4,502,955 | 3/1985 | Schaupp | 210/149 |
| 4,510,051 | 4/1985 | Diry | 210/94 |
| 4,579,657 | 4/1986 | Hood, Jr. | 210/314 |
| 4,836,923 | 6/1989 | Popoff et al. | 210/232 |

OTHER PUBLICATIONS

Fram Advertising Brochure, p. 28.

*Primary Examiner*—W. Gary Jones
*Assistant Examiner*—Matthew O. Savage
*Attorney, Agent, or Firm*—Chilton, Alix & Van Kirk

[57] ABSTRACT

A fuel filter assembly employs a base which mounts a disposable filter element cartridge. The cartridge includes a dual stage filter system wherein fuel flows axially to a primary filter element for removing particulate matter and coalescing water droplets and axially to a secondary filter stage which functions as a water barrier. The filtered fuel flows axially and exits through an outlet passage in the base. Water may be collected in a sump. The cartridge is retained on the base by a collar which engages against a roll seam structure of the cartridge. In one embodiment the base has a cannister configuration for receiving the cartridge.

21 Claims, 8 Drawing Sheets

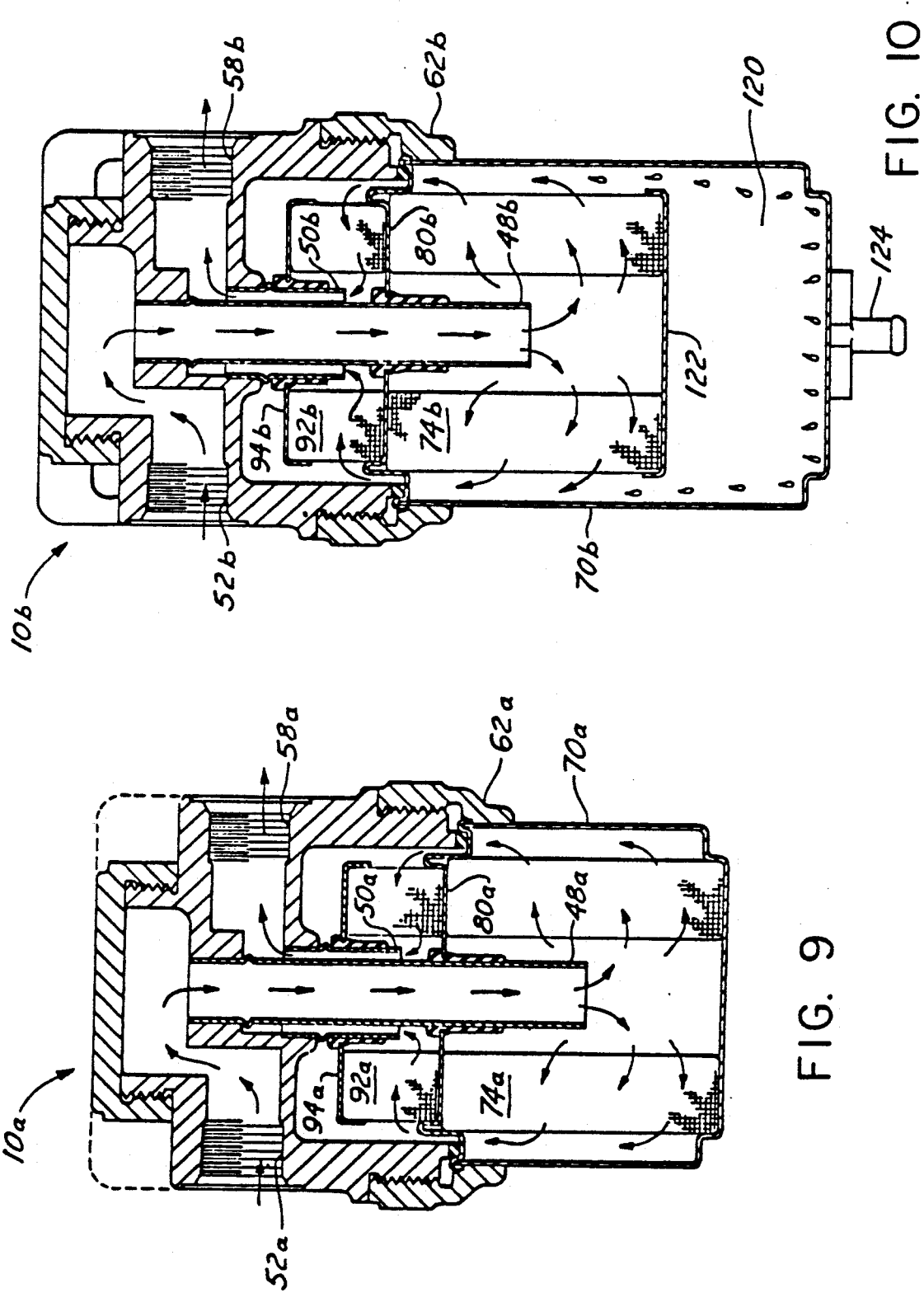

FUEL FILTER

CROSS-REFERENCE TO RELATED APPLICATION

This application is a continuation-in-part of U.S. application Ser. No. 404,849 filed on Sep. 8, 1989 which is a continuation-in-part of U.S. application Ser. No. 372,645 filed on June 28, 1989.

BACKGROUND OF THE INVENTION

This invention relates generally to devices for filtering and separating liquids. More particularly, the present invention relates to fuel filters for removing foreign particles and separating water from fuel of the fuel supply system of an internal combustion engine.

The absence of high standards of quality control in diesel fuel supplies dictates that an effective fuel filter be incorporated into the fuel supply system for a diesel engine. It is not uncommon for diesel fuel to have significant quantities of abrasive particles and water. The abrasive particles present the potential for permanent damage to components of the fuel injection pump. The abrasive particles can also adversely effect the performance of the pump by destroying the ability of the fuel injection pump to precisely meter and deliver fuel at high pressures. The presence of water in the diesel fuel supply can cause rusting of engine components, and during freezing conditions, can result in interruption of the fuel injection system and/or seizure of moving components.

Diesel fuel also contains a waxy constituent which precipitates as wax crystals when the fuel temperature drops below a characteristic "cloud point". In cold weather conditions, the precipitating wax crystals can rapidly plug a fuel filter and thereby cut off fuel delivery to the internal combustion engine.

A number of conventional fuel filters perform the dual function of removing particulate material from the diesel fuel and separating water from the fuel. In addition, conventional fuel filter units or fuel conditioners frequently employ heaters to prevent wax crystal formation. Commonly, the fuel filters employ a disposable filter cartridge which is replaced at pre-established intervals of filter usage.

U.S. Pat. No. 4,491,120 assigned to the assignee of the present invention, discloses a fuel conditioner to which the present invention relates. A disposable filter/water separator cartridge is releasably secured to a base. A multi-stage filter assembly within the cartridge includes filtering and coalescing media and separates an upper portion of the chamber from a lower portion which functions as a water collection sump. A heater mounted in the base warms the fuel before the fuel enters the cartridge. The fuel conditioner also features sensing devices in the base to indicate the presence of a predetermined quantity of water in the sump and the occurrence of a plugged filter condition. A priming pump is also manually operable to restore the fuel conditioner to operational condition after the cartridge replacement.

SUMMARY OF THE INVENTION

Briefly stated, the invention in a preferred form is a fuel filter assembly which includes a base and a disposable filter cartridge mountable to the base. The base includes a fuel inlet passage, a fuel outlet passage, a central first conduit which interiorly defines a first axial passage communicating with the inlet passage, and a second conduit which surrounds the first conduit and defines a second axial passage which communicates with the outlet passage. The base also forms a sump which collects water separated from the fuel. The cartridge comprises a container-like housing. A primary filter unit enclosed in the housing comprises a pleated primary filter element defining a first chamber which communicates with the first axial passage and a second chamber surrounding the first chamber. A secondary filter element extends exteriorly from the housing. The base and secondary filter element cooperate to define a third chamber and an inner fourth chamber. The fourth chamber is surrounded by the third chamber. The fourth chamber communicates with the second axial passage.

The first and second axial passages are preferably coaxial. The housing also includes a first endcap and a first sealing grommet surrounding an opening for fluidly sealing the endcap with the first conduit. A second endcap axially spaced from the first endcap mounts a second sealing means for fluidly sealing the second endcap to the second conduit. The secondary filter element is disposed between the first and second endcaps. The first endcap also has a plurality of angularly spaced apertures which provide fluid communication between the second and third chambers.

A heating unit comprising a heat rod extending axially in the first conduit is employed for heating fuel. The secondary filter element is impervious to the passage of water. The primary filter element contains water coalescing properties which result in the formation of water droplets in the second chamber.

The inlet passage has an inlet port and the outlet passage has an outlet port. The ports are located at diametrically opposed locations of the base. The sump has a pair of sump sections with the inlet and outlet passages being disposed between the sump sections. A water level sensor is disposed in the sump. A drain cock is also disposed in the sump for draining collected water from the filter assembly.

A fuel filter cartridge in accordance with the invention includes a container which forms a housing. A continuous fan-shaped, pleated primary filter element is disposed in the housing. The primary filter element has water coalescing properties and defines a central inner region on one side of the element and an outer region on the opposite side of the element. An endcap connects at one end of the housing and encloses the primary element. The endcap defines a central opening. A sealing grommet is mounted in the opening for fluidly sealing a conduit which is received through the opening. A secondary filter element disposed axially from the primary filter element is located exteriorly of the housing. The secondary filter element is impervious to the passage of water and defines a central inner region. A second endcap encloses an axial end of the secondary filter element. The endcap defines a central opening which is coaxial with the first opening. A sealing grommet is received in the second opening for fluidly sealing a second conduit which is received through the second opening. The first endcap has a plurality of angularly spaced apertures. Both the first and second filter elements have a fan-shaped pleated configuration. The first endcap comprises a plate which is bent to form a first shoulder which engages peripheral edge proportions of the first element and a second shoulder of smaller diameter which engages peripheral edge proportions of the second element.

The first endcap connects with the container housing along a circumferential roll seam. A sealing ring is disposed between the first endcap and an upper shoulder of the base. A retaining collar is threaded to the base and axially engages the top of the roll seam to secure the cartridge to the base and to load the sealing ring.

In one embodiment, the base has an upper cannister-like configuration. The disposable filter cartridge is received in the cannister portion and secured by a threaded collar which engages a roll seam of the cover.

An object of the invention is to provide a new and improved fuel filter adaptable for use in filtering the fuel supplied to a diesel engine.

Another object of the invention is to provide a new and improved fuel filter of efficient low cost construction which provides an effective and efficient means for filtering particulate matter from the fuel and for removing water from the fuel.

A further object of the invention is to provide a new and improved fuel filter having a disposable cartridge element incorporating a dual stage filter assembly.

Other objects and advantages of the invention will become apparent from the drawings and the specification.

BRIEF DESCRIPTION OF THE DRAWINGS

FIG. 9 is an enlarged fragmentary sectional view of a second embodiment of a fuel filter assembly in accordance with the present invention;

FIG. 10 is an enlarged fragmentary sectional view of a third embodiment of a fuel filter assembly in accordance with the present invention.

DETAILED DESCRIPTION OF THE INVENTION

Figure 1:
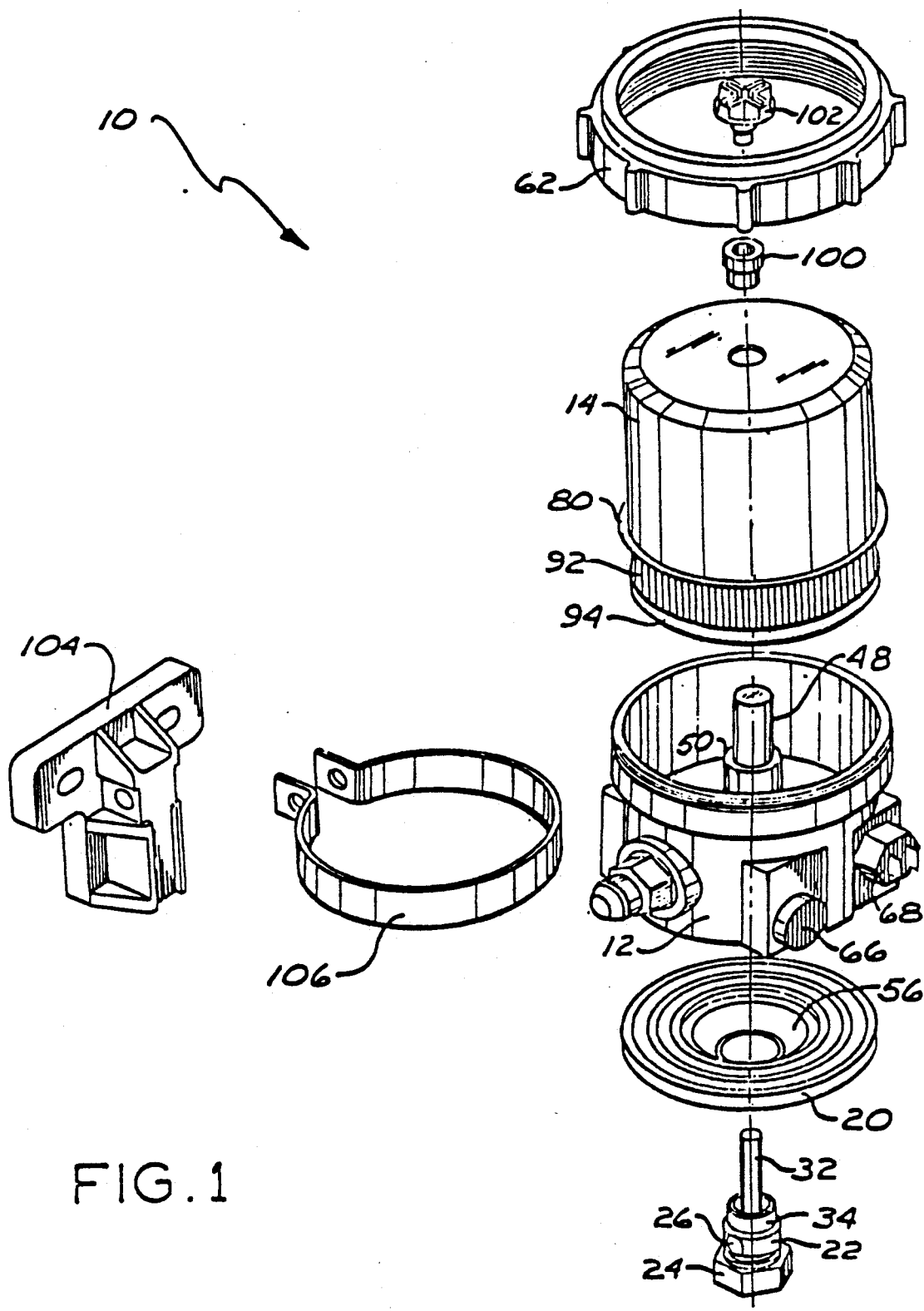
FIG. 1 is an exploded view of a fuel filter assembly in accordance with the present invention.

With reference to the drawings wherein like numerals represent like parts throughout the several figures, a fuel filter assembly in accordance with the present invention is generally designated by the numeral 10. Fuel filter assembly 10 comprises a base 12 and a disposable filter cartridge 14. The fuel filter assembly is especially adapted for incorporation into the fuel supply system of an internal combustion engine (not illustrated) such as a diesel engine for removing particulate matter from the fuel and for separating water from the fuel. In addition, the fuel filter assembly 10 includes a heater for heating the fuel during cold conditions to prevent the precipitation of wax crystals from the fuel.

The base 12 rests on a header endcap 20 which has an opening through which an electric fuel heater 22 is inserted. Electric fuel heater 22 includes an integral endcap bolt 24 and an opening 26 which leads to an internal chamber 28. A heating rod 32 projects axially from the fuel heater bolt 24. The fuel heater contains an intermediate threaded surface 34 which threads into a complementary threaded portion of the base 12 for mounting the base to the header endcap 20. Seal rings 36 and 38 are mounted in annular grooves of the header endcap for sealing the base with the endcap.

Base 12 is a quasi-cup-like member which includes an interior diametral shoulder 40. The shoulder 40 separates the lower portion of the base into a pair of sumps 42 and 44 for collecting water which is separated from the fuel by the filter assembly. A transverse passage 43 through shoulder 40 connects sumps 42 and 44. A central stepped bore 46 extends axially through the shoulder. The bore 46 has a threaded opening at the lower interior portion for threading with the heater element 22.

A sleeve 48 having an intermediate integral locating ring 51 is closely partially received in a reduced segment of the bore 46. The diameter of the sleeve is greater than the diameter of the heating rod 32 of the heater element and extends in coaxial relationship with rod 32 so as to radially enclose the heating rod 32. The upper segment of the bore 46 has an enlarged diameter. A second sleeve 50 is closely received in the enlarged bore portion in concentric relationship with sleeve 48. Sleeve 50 has an intermediate integral locating ring 53 and has a reduced axial length in comparison to that of sleeve 48. The sleeve 50 and its locating ring 53 provide a variable clearance between the base 12 and the cartridge which allows for tolerance buildup. An annular axial passage 49 is formed between sleeves 48 and 50. Sleeves 48 and 50 function as axial fluid conduits.

A fuel inlet passage 52 includes a threaded female connector 54. The fuel inlet passage extends radially and axially in the shoulder and opens through an annular recess 56 in the endcap 20. A fuel outlet passage 58 extends radially in general alignment with fuel inlet passage 52. An enlarged annulus surrounding the inner sleeve 48 in axial communication with passage 49 (defined between sleeves 48 and 50) leads to the outlet passage 58. The fuel outlet passage includes a threaded female connection 59 for connecting with an outlet fuel line.

A threaded surface at the upper peripheral portion of the base is configured for threaded engagement with a retaining collar 62 for securing the disposable filter cartridge 14 to the base 12. An upper circumferential lip 64 of the base receives an O-ring 65 which is engaged by the underside of the cartridge 14. A drain cock 66 and a water sensor 68 are threaded into the side of the base for interior communication with sump 42. The water level sensor 68 electrically communicates with the compartment of the vehicle for indicating that the water level has reached a pre-established level so that the water can be manually drained from the sumps by rotatably loosening the drain cock 66.

Figure 5:
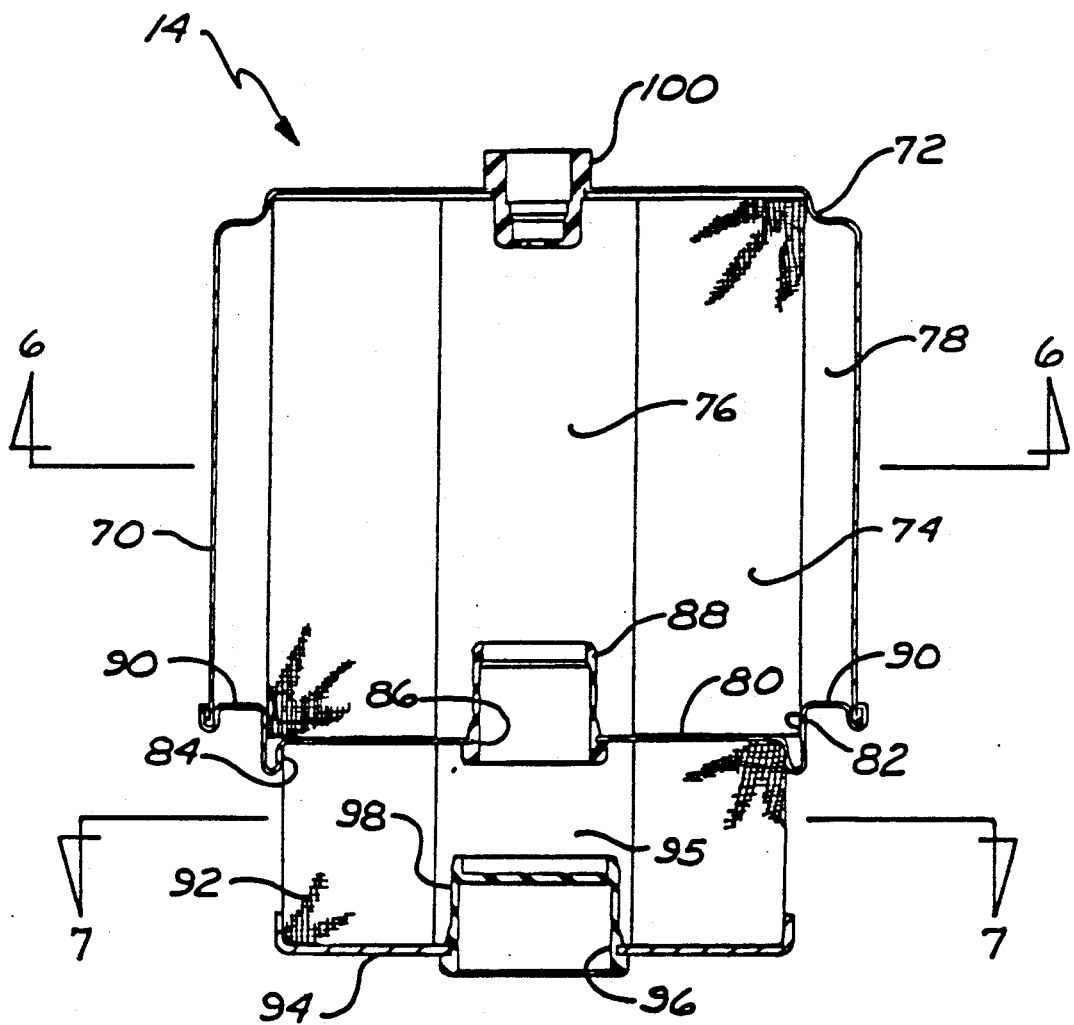
FIG. 5 is a sectional view of the cartridge portion of the fuel filter assembly of FIG. 1.
Figure 6:
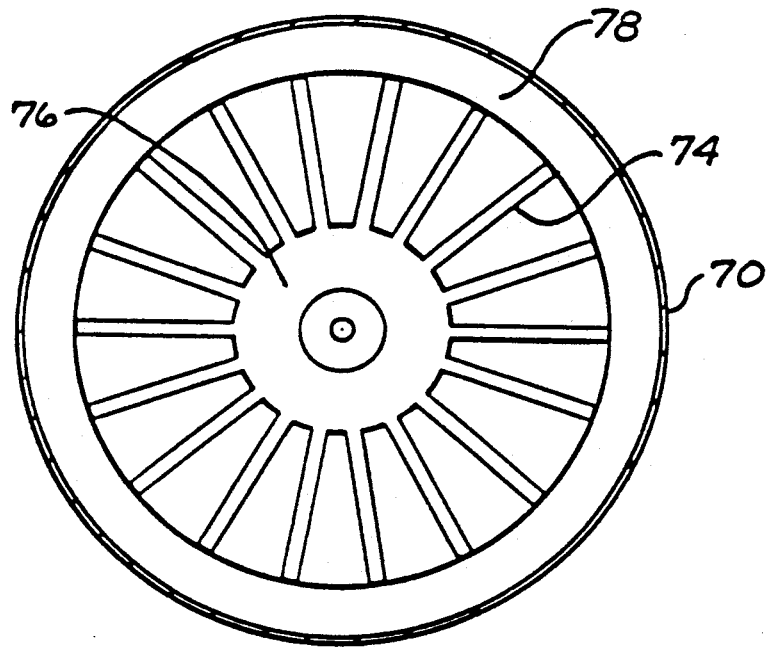
FIG. 6 is a sectional view of the filter cartridge taken along the line 6—6 of FIG. 5.
Figure 7:
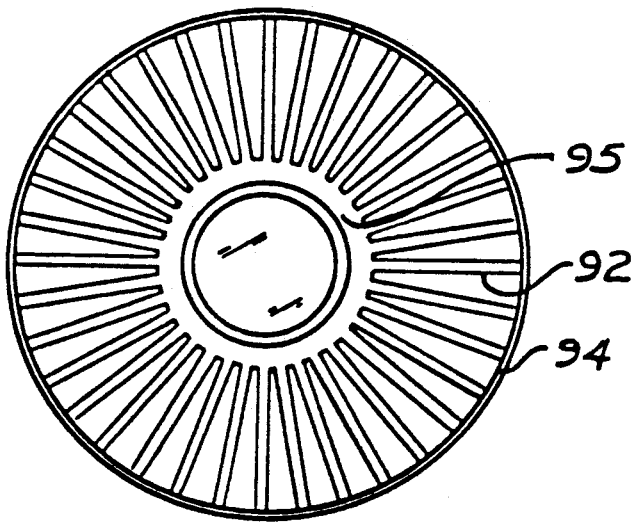
FIG. 7 is a sectional view of the filter cartridge taken along the line 7—7 of FIG. 5.

With additional reference to FIG. 5, the disposable filter cartridge 14 comprises a can-like container 70 which is configured to have an upper peripheral recessed indentation 72. A primary stage filter element 74 having a continuous fan-shaped pleated form is received in the container. The filter element 74 axially extends slightly below the bottom of the side wall of the container. The primary filter element thus defines an interior central axial chamber 76 and quasi-annular outer chamber 78. The primary filter element is affixed with resin binders or other water coalescers so that as the fuel passes from the passage 76 through the filter element 74 to chamber 78, the water coalesces to form water droplets in the coalescing chamber 78.

A primary stage endcap 80 encloses the primary filter element. The endcap 80 is rolled and fastened against the bottom edge portions of the container to form a circumferential roll seam 81 having an upper retaining shoulder 83. The endcap 80 is also folded so as to have an inner annular retaining shoulder 82 which engages the lower portion of the filter element 74 for locating the element. The endcap 80 also defines at an inner underside location an annular retaining shoulder 84 which is generally coaxial with shoulder 82 and has a smaller diameter than shoulder 82. A central circular opening 86 through the endcap receives an elastomeric sealing element 88 which is dimensioned to fluidly seal against sleeve 48 upon mounting the filter cartridge to the base. The axially spaced edge portions of the primary filter element 74 are secured to the upper underside of the container and the upper surface of the endcap 80 by adhesive such as "Plastisol" adhesive. An upper annular platform formed by the endcap at the bottom of the coalescing chamber 78 includes a plurality of angularly spaced apertures 90. The coalesced water droplets drop through the apertures 90 from chamber 78 and are collected in the sumps 42 and 44 as will be described hereinafter.

A secondary filter element 92 having a continuous fan-shaped, pleated configuration extends from the underside surface of endcap 80. The upper peripheral edges of the filter element 92 retainably abut against shoulder 84 of the endcap 80. A secondary stage endcap 94 encloses the axial end of the filter element 92. Endcap 94 includes a peripheral flange which is upturned so as to retainably engage the peripheral edges of the filter element. A circular opening 96 through the central portion of the endcap receives an elastomeric sealing grommet 98. Sealing grommet 98 is dimensioned and positioned for fluidly sealing against the outer sleeve 50 when the filter cartridge is mounted on the base. Adhesive such as "Plastisol" adhesive is applied to the end portions of filter element 92 for securing the filter element to endcaps 80 and 94.

The exterior surfaces of the secondary filter element 92 function as a water barrier which prevents water passage to the central chamber 95 defined between endcaps 80 and 94. Secondary filter element 92 may be comprised of a porous substance which is saturated with silicon so as to form the exterior water barrier. In the unmounted state such as illustrated in FIGS. 1 and 5, a substantial portion of the exterior surface of filter element 92 is exposed at the underside of the container 70.

The top cover of container 70 also includes a circular opening through which a valve body 100 is inserted. The valve body 100 is sealed to the container with adhesive. A releasable air vent valve 102 is positionable in the valve body. The air vent valve functions to controllably release air from the interior of the fuel filter. The air vent valve 102 may be removed from the valve body 100 and reinserted into the valve body of a new cartridge upon replacement of a spent cartridge.

In practice, the disposable filter cartridge 14 is mounted to the base 12 by forcing the cartridge over the sleeves 48 and 50 of the base so that the elastomeric grommets 88 and 98 diametrically seal against the respective sleeves 48 and 50. With additional reference to FIG. 8, the underside of endcap 80 engages an elastomeric O-ring 65 which is positioned against lip 64 of the base. The retaining collar 62 is then threaded to the base and axially engageable against the roll seam shoulder 83 of the container 70 to compressively load the O-ring 65 and secure the cartridge in a fluid tight relationship with the base.

The roll seam 81 has a multi-layer configuration which imposes a rigid structure at the endcap/container interface. The O-ring 65 is located in close proximity to the roll seam 81 at a cartridge location having a high degree of structural integrity. A substantial compressive force may thus be exerted against the O-ring through the endcap 80 without jeopardizing the structural or functional integrity of the cartridge.

Figure 8:
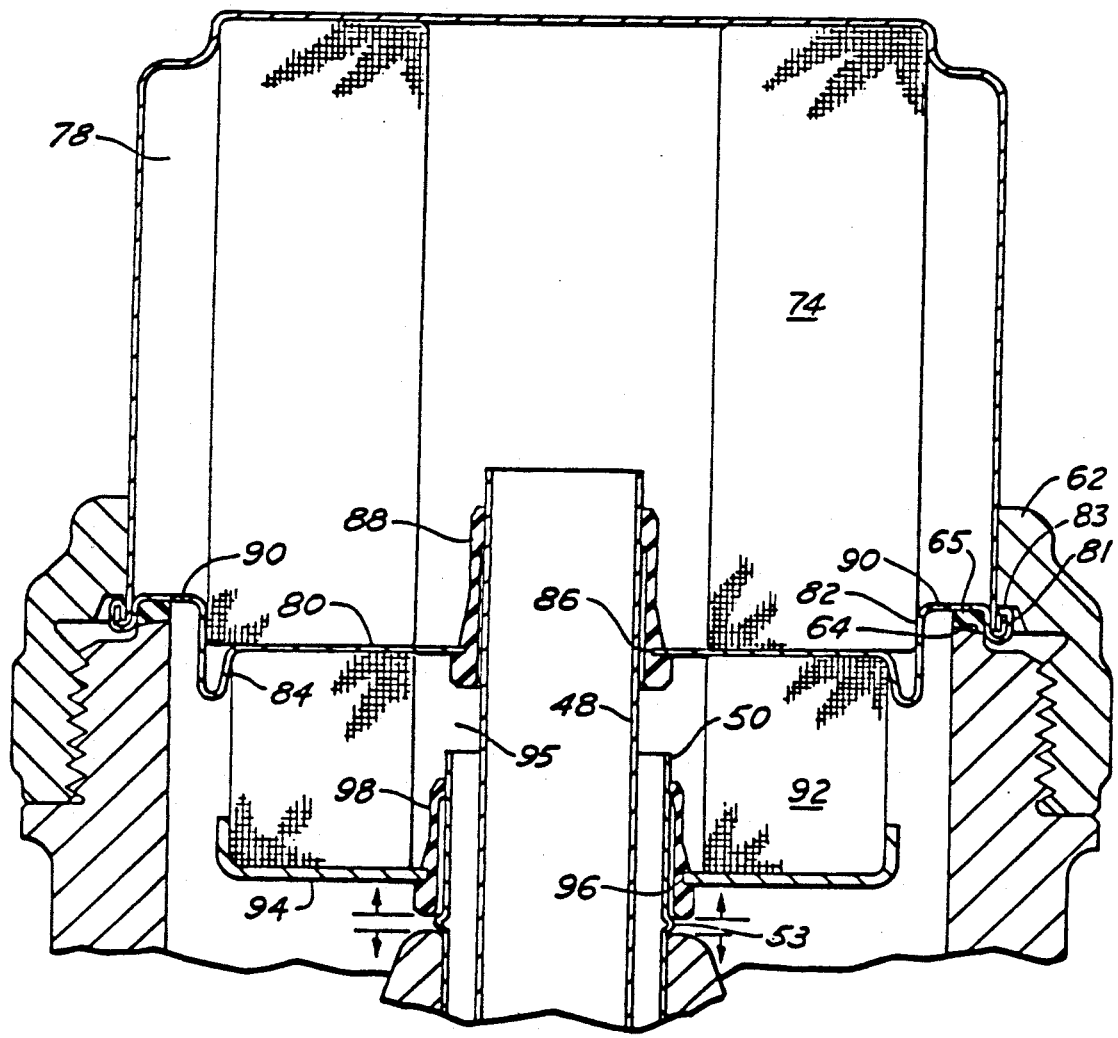
FIG. 8 is an enlarged fragmentary sectional view of the fuel filter assembly of FIG. 1.

The only cartridge sealing element which is compressively loaded is O-ring 65. Grommets 88 and 98 essentially function as diametrical seal elements and are not compressively loaded. Consequently, the cartridge is axially "floatable" to a limited degree relative to sleeves 48 and 50 to compensate for any tolerance build-up that may be present. The heavy arrows of FIG. 8 illustrate the floating type mounting relative to locating ring 53.

The lip 64 is preferably inclined (from the inner to outer portions) at a downward angle so that the axial compressive load functions additionally to center the cartridge on the base. The inclined lip configuration also tends to force the O-ring sealing interface radially away from the apertures 90 to insure unobstructed fluid communication therethrough.

The fuel filter assembly may be suitably mounted to the vehicle by means of a bracket 104 having cooperative shoulders which receive a clamp ring 106. A bolt (not illustrated) extends between aligned openings of the clamp ring and an opening in the bracket for securing the clamp ring to the bracket. The clamp ring 106 surrounds and clampingly engages a recessed neck 108 of the base for securing the base in position.

Figure 2:
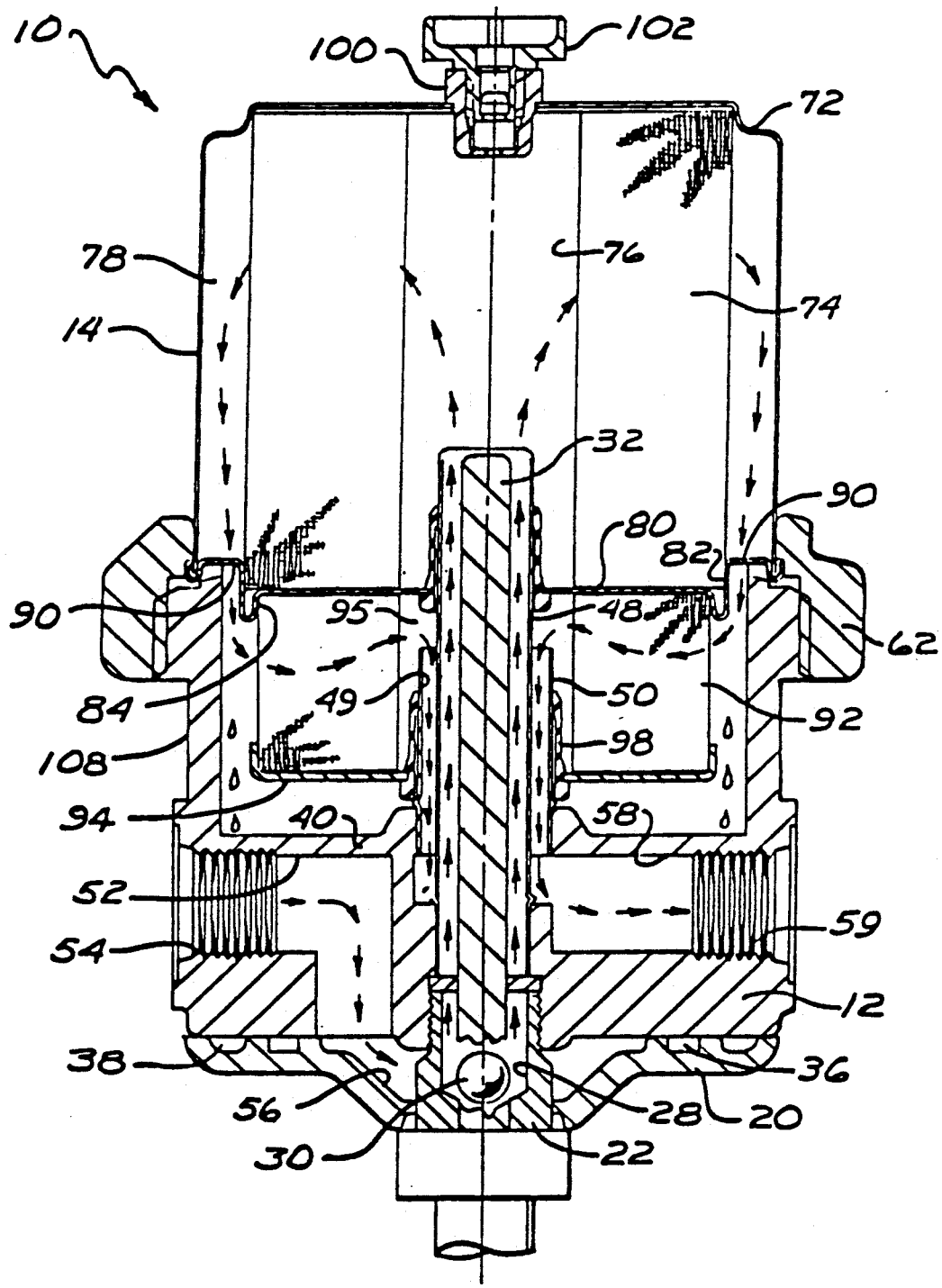
FIG. 2 is a sectional view of the assembled fuel filter assembly of FIG. 1.
Figure 3:
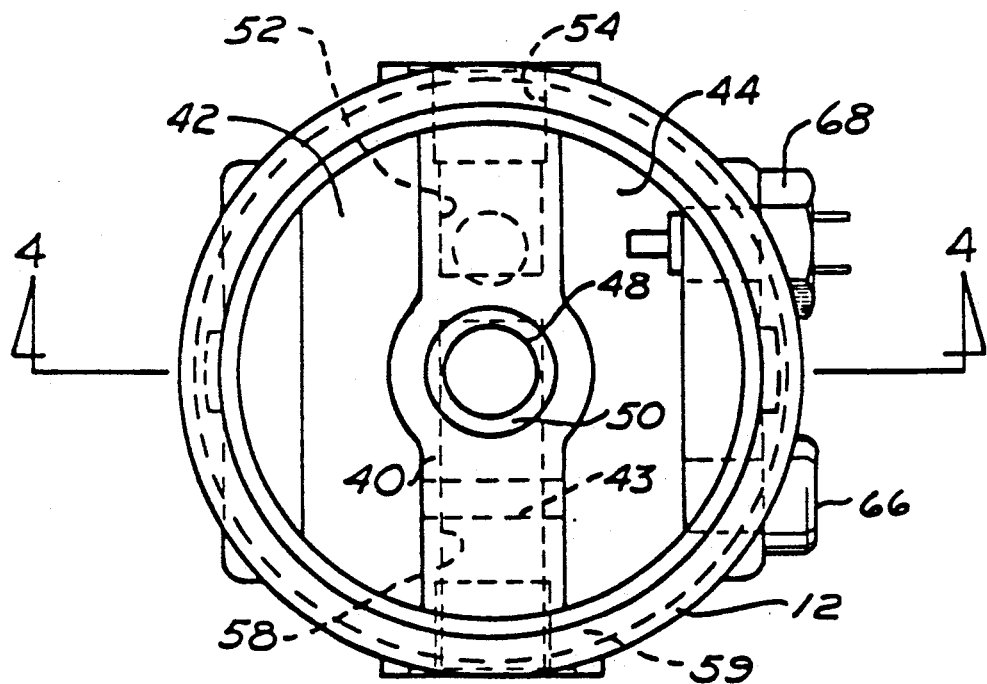
FIG. 3 is a top plan view of the base portion of the fuel filter assembly of FIG. 2, said base portion being rotated 90° to the orientation of FIG. 2.
Figure 4:
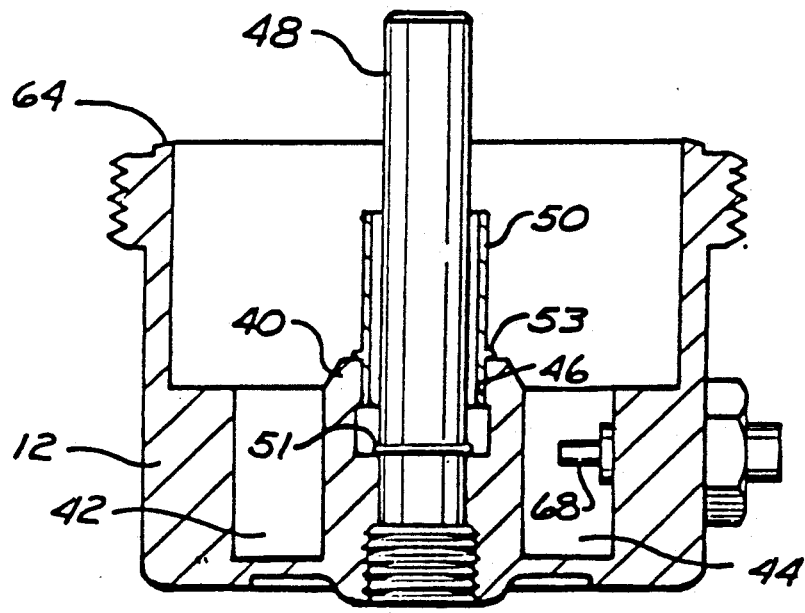
FIG. 4 is a cross-sectional view of the base portion taken along the line 4—4 of FIG. 3.

The flow path of fuel through the filter assembly is illustrated by the arrows in FIG. 2. In operation, fuel is supplied to the inlet passage 52 for traversal through annulus 56 and opening 26 to the heat chamber 28. The fuel then flows axially through sleeve 48 in close proximity to heat rod 32 so that the fuel may be heated if required. The fuel continues axially upwardly (in the direction of the arrows in FIG. 2) into the primary chamber 76 for outward traversal through the primary filter element 74. The filter element 74 functions to remove particulate matter from the fuel. The particulate matter is entrapped on the upstream side of the primary filter element 74. The fuel passes into the coalescing chamber 78 wherein water coalesces as droplets from the fuel and passes along with the fuel through apertures 90. The water continues downwardly for collection in the sumps 40 and 42. The secondary stage filter is a water barrier which prevents the entry of water into the secondary stage chamber 94.

The filtered fuel then passes through secondary stage element 92 to the interior chamber 95 for generally axial traversal through passage 49 between sleeves 48 and 50 (as illustrated by the arrows in FIG. 2). The filtered fuel then flows generally radially out the outlet passage 58 for delivery to the fuel injection pump and/or engine.

The foregoing fuel filter assembly 10 provides an efficient means for filtering particulate matter from the fuel, for removing water from the fuel and for heating the fuel if required to a sufficient temperature to prevent the precipitation of wax crystals. Furthermore, the filter cartridge 14 is disposable so that when the effectiveness of the filter cartridge is expended, a new cartridge may be mounted in place as required. The retaining collar 62 is threadably loosened, the releasable air vent 102 is removed from the cartridge element, and a new cartridge is suitably secured in position.

It should be appreciated that for some applications the installed fuel filter assembly may be inverted, i.e., the cartridge mounted below the base as best illustrated in FIGS. 9 and 10. With reference to FIG. 9, the fuel filter assembly 10a also principally differs from fuel filter assembly 10 in that the primary and secondary filter elements 74a and 92a essentially function as a dual stage fuel filter without additionally employing an effective provision for removing water from the fuel. Components of fuel filter assembly 10a which correspond to those previously described are designated generally by the numerals corresponding to the components of fuel filter assembly 10 followed by the letter "a". The fuel enters the fuel filter assembly 10a through fuel inlet passage 52a and exits the filter through outlet passage 58a. The general flow path of the fuel through the filter assembly is generally designated by the arrows of FIG. 9. The fuel flow path is essentially directionally inverted in comparison to the path of FIG. 2.

Fuel filter assembly 10b illustrated in FIG. 10 is an inverted fuel filter (as compared to FIGS. 1-5) which also functions as a water separator. The container 70b of the cartridge portion surrounding the primary filter element 74b is elongated to provide a chamber or sump 120 which is below the primary filter element. A lower endcap 122 is also mounted over the lower axial end of the filter element 74b. The primary filter element 74b has water coalescing properties so that water droplets form at the outlet side of the filter element and fall to the bottom of the sump 120 (as schematically illustrated in FIG. 20). A drain cock 124 is mounted at the bottom of the sump for draining the collected water from the filter. The container 70b may be manufactured from a transparent or translucent material to permit visual inspection of the water level. The general fuel flow path through filter assembly 10b is generally designated by the arrows in FIG. 10.

Figure 11:
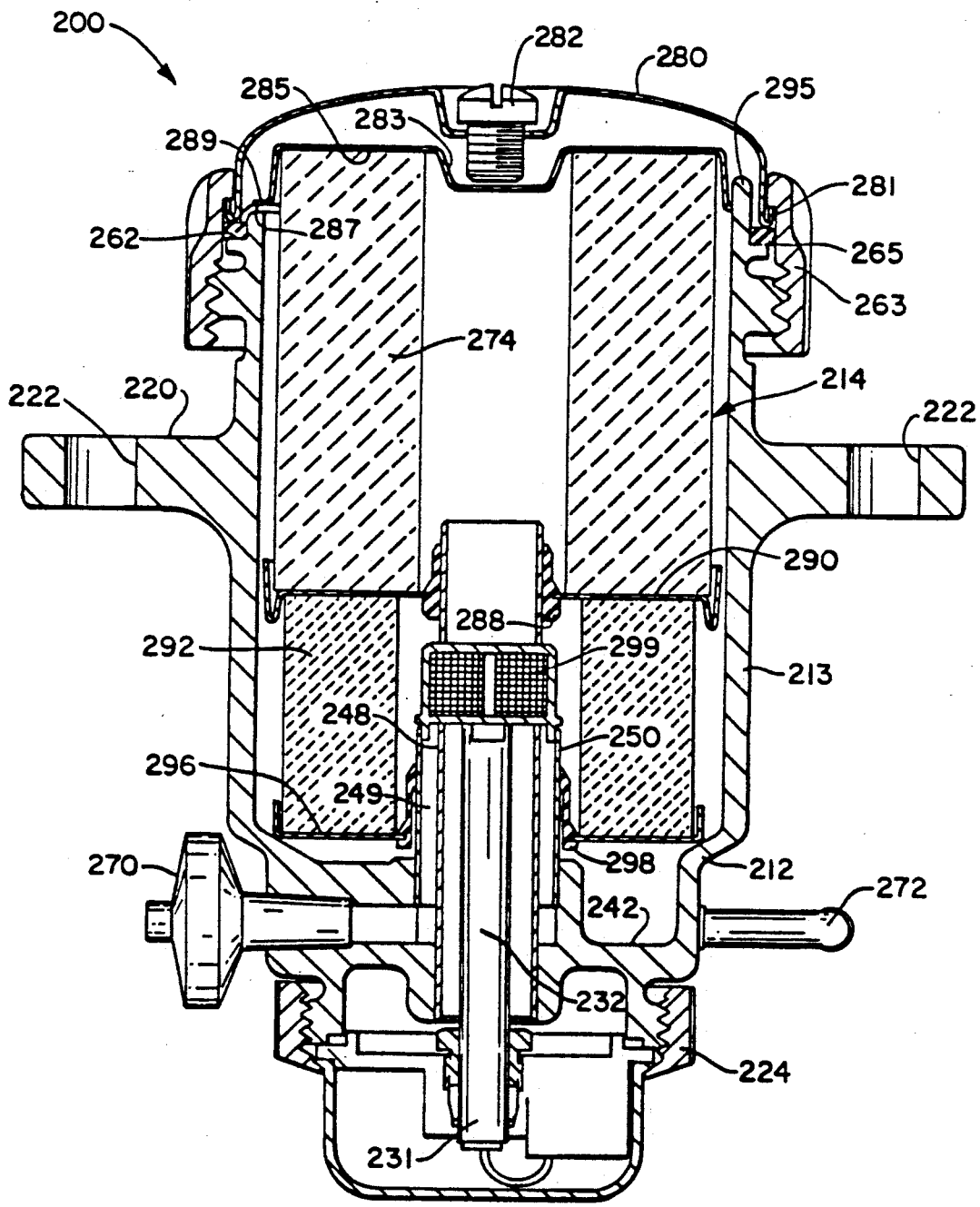
FIG. 11 is a sectional view of a fourth embodiment of a fuel filter assembly in accordance with the present invention.

With reference to FIG. 11, another embodiment of a fuel filter assembly is generally designated by the numeral 200. Fuel filter assembly 200 is an upright cannister-type fuel assembly wherein the filter cartridge is loaded at the top into the cannister-like base. The base 212 is generally similar in form and function to the previously described base 12 except that base 212 has an axially elongated cylindrical portion so as to form the filter cannister 213. Mounting shoulders 220 integrally project from the sides of the cannister and define axial openings 222 which receive fasteners for securing the base to the engine. The cannister has an open upper end for receiving the cartridge 214. Upper peripheral portions of the cannister are threaded. A peripheral lip 262 extends the circumference of the cannister 213 adjacent to the upper end for receiving an O-ring 265 which seals with the cannister. A threaded retainer collar 263 engages an upper portion of the cartridge and threads with the upper cannister exterior to secure the cartridge in position with the base.

A heating unit 231 including a heating rod 232 may be mounted at the underside of the base and secured thereto by means of a threaded retaining collar 224. The base 212 is further configured with a sump 242 and a stepped-cylindrical opening which receives an inner sleeve 248 and an outer sleeve 250 which are similar in form and function to that previously described for respective sleeves 48 and 50. A pressure switch 270 may also be mounted in the base. A water sensor (not illustrated) may also be mounted in the base. A water drain 272 extends from the base for draining the sump 242.

Cartridge 214 includes a cover 280 which forms the exterior surface of the mounted cartridge and includes a central opening for receiving an air vent 282. A liner member or endcap 283 includes a central indentation for accommodating the air vent. The liner member is shaped to form an annular recess or interior mounting surface 285 and an annular panel 287 which may include one or more apertures 289 to provide communication with the air vent. The cover 280 and liner 285 are preferably metallic members which are joined along a roll seam 281. The seam 281 also functions as an engagement shoulder for axial engagement by the retaining collar 263 to thereby threadably lock the cartridge 214 to the cannister 213.

A primary filter element 274 of fan-shaped pleated form is mounted at the underside of the liner at the formed recess 285 by means of an adhesive. Filter element 274 extends axially from the cover. A medial plate or endcap 290 has a compound bend which engages lower peripheral portions of the filter element and engages the axial end of the primary element filter 274. The medial plate 290 is mounted to the primary filter element by an adhesive. The plate 290 includes a central opening which receives an elastomeric sealing grommet 288. Grommet 288 is similar in form and function to grommet 88.

A secondary filter element 292 is mounted to the underside of the medial plate 290 by an adhesive. Medial plate 290 is bent in compound fashion to form an upper flange that engages lower peripheral portions of filter element 274 and a lower flange which engages upper peripheral portions of filter element 292. The secondary filter element 292 extends axially in generally coaxial relationship with the primary filter element 274. An endcap 296 includes an upstanding peripheral flange which engages lower end portions of the secondary filter element. The endcap 296 is mounted to the element 292 by means of an adhesive. The endcap 296 also includes a central opening which receives an elastomeric sealing grommet 298 similar in form and function to grommet 98. "Plastisol" adhesive is a suitable adhesive for the cartridge.

An annular filter screen 299 is mounted at the upper axial end of the outer sleeve 250 and surrounds the inner sleeve 248 to filter fuel entering passage 249. Filter screen 299 is especially employed to prevent dirty fuel from entering the fuel system when the cartridge is removed from the base.

The upper portion of the cannister may also include one or more integral axially projecting keys 295 which are receivable in corresponding slots formed in the annular panel 287 of the liner. The keys and slots may be selectively dimensioned and positioned to uniquely mate a cartridge with a given base to ensure compatibility therewith.

It will be appreciated that the foregoing fuel filter assembly 200 generally functions in a manner generally similar to that previously described for filter assembly 10.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fuel filter assembly comprising:
   base means comprising a base forming a cannister having an open end, said base means having a fuel inlet passage, a fuel outlet passage, central first conduit means for interiorly defining a first axial passage communicable with said inlet passage and second conduit means surrounding said first conduit means for defining a second axial passage communicating with said outlet passage;
   filter cartridge means receivable in said cannister and mountable to said base means for removing particulate matter and water from fuel, said cartridge means comprising:
   cover means comprising a cover and a first endcap connected to said cover along a circumferential seam forming a retaining shoulder;
   first filter means mounted to said first endcap and extending exteriorly of said cover and defining a first chamber communicating with said first axial passage;
   second filter means comprising a second filter element disposed axially relative to said first filter means, said second filter element extending exteriorly of said cover means and defining a second chamber communicating with said second axial passage; and
   retainer means comprising a collar threadably engageable with said base means and axially engageable against said retaining shoulder for securing said cartridge means to said base means.

2. The fuel filter assembly of claim 1 wherein said first and second axial passages are coaxial.

3. The fuel filter assembly of claim 1 further comprising a medial endcap disposed between said first and second filter means wherein said medial endcap defines a first opening dimensioned to receive said first conduit means and further comprising first sealing means for fluidly sealing said medial endcap with said first conduit means.

4. The fuel filter assembly of claim 3 further comprising a third endcap axially spaced from said medial endcap, said second filter element being disposed between said medial and third endcaps.

5. The fuel filter assembly of claim 4 wherein said third endcap defines a second opening dimensioned to receive said second conduit means and further comprising second sealing means for fluidly sealing said third endcap to said second conduit means.

6. The fuel filter assembly of claim 1 wherein said base means further comprises a lip and further comprising cover sealing means sealable between said lip and said cover for fluidly sealing said cartridge means to said base means.

7. The fuel filter assembly of claim 6 wherein said cover sealing means is located in close proximity to said seam and is compressively loaded by threadably tightening said retainer means against said seam.

8. The fuel filter assembly of claim 7 further comprising sump means for collecting separated water.

9. The fuel filter assembly of claim 1 wherein said second filter element is generally impervious to the passage of water therethrough.

10. The fuel filter assembly of claim 1 further comprising at least one key projecting from said base means, and said cover means defines at least one slot for matably receiving said at least one key.

11. The fuel filter assembly of claim 1 further comprising a generally annular filter screen disposed at the axial end of said second conduit.

12. The fuel filter assembly of claim 1 further comprising a circumferential lip projecting transversely from said cannister adjacent said open end and sealing means for sealing said cover means with said lip.

13. A fuel filter cartridge comprising:
   cover means for forming a cover having an exterior an interior mounting surface and an exterior peripheral retaining shoulder;
   first filter means comprising a first filter element having a first end and an axially spaced second end and defining a central inner region, said filter element being mounted to said mounting surface at said first end;
   medial endcap means mounted to said filter element second end, said medial endcap means defining a medial central opening, medial sealing means received in said medial opening for fluidly sealing a conduit received through said medial opening;
   second filter means comprising a second filter element having axially spaced first and second ends and defining a central inner region, said filter element being mounted to said medial endcap at said first end;
   second endcap means mounted to said second filter element at said second end, said second endcap means enclosing an axial end of said second filter means, said second endcap means defining a second central opening coaxial with said medial opening, and a second sealing means received in said second opening for fluidly sealing a second conduit received through said second opening.

14. The fuel filter cartridge of claim 13 wherein said medial endcap means comprises a plate which is bent in compound fashion to form a first flange which engages outer peripheral edge portions of the first element and a second flange which engages outer peripheral edge portions of the second element.

15. The fuel filter cartridge of claim 14 wherein said cover means comprises a cover member defining said exterior surface and an inner cap member which defines said interior mounting surface, and said cover member and inner cap member are joined in a roll seam to form said shoulder.

16. The fuel filter cartridge of claim 15 wherein said cover defines an opening and further comprising an air vent disposed in said opening and said inner cap member defines at least one aperture.

17. The fuel filter cartridge of claim 16 wherein said inner cap member further comprises a generally annular surface portion defining at least one slot.

18. A fuel comprising:
   base means comprising a base having a fuel inlet passage, a fuel outlet passage, central first conduit means for interiorly defining a first axial passage communicable with said inlet passage and second conduit means surrounding said first conduit means for defining a second axial passage communicating with said outlet passage, said base means comprising a cannister and a lip projecting from said cannister;

filter cartridge means mountable on said base means for filtering fuel, said cartridge means comprising: cover means comprising a cover and a retaining shoulder;

first filter means mounted to said cover means comprising a first filter element enclosed by said cannister and defining a first chamber communicating with said first axial passage and a first endcap defining first opening means for receiving said first conduit means in fluid tight relationship;

second filter means comprising a second endcap defining second opening means for receiving said second conduit means in fluid tight relationship and comprising a second filter element generally impervious to the passage of water enclosed by said cannister and extending between said first and second endcaps;

sealing means for fluidly sealing said cartridge means to said base means comprising a sealing ring compressively sealable between said lip and said cover means; and retainer means comprising a collar threadably engageable with said base means and axially engageable against said shoulder for securing said cartridge to said base means.

19. The fuel filter assembly of claim 18 wherein said sealing means comprises an O-ring which is compressively loaded by threadably tightening said collar against said base means.

20. The fuel filter assembly of claim 19 wherein said cover means further comprises a pair of members which are joined in a roll seam which defines said shoulder.

21. A fuel filter assembly comprising:
base means comprising a base forming a cannister having an open end, said base means having a fuel inlet passage, a fuel outlet passage, central first conduit means for interiorly defining a first axial passage communicable with said inlet passage and second conduit means surrounding said first conduit means for defining a second axial passage communicating with said outlet passage;

filter cartridge means receivable in said cannister and mountable to said base means for removing particulate matter and water from fuel, said cartridge means comprising:
cover means comprising a cover and a first endcap connected to said cover along a circumferential seam forming a retaining shoulder;

filter means mounted to said cover means, said filter means defining a first chamber communicating with said first axial passage and defining a second chamber communicating with said second axial passage; and retainer means comprising a collar threadably engageable with said base means and axially engageable against said retaining shoulder for securing said cartridge means to said base means.

* * * * *

UNITED STATES PATENT AND TRADEMARK OFFICE
CERTIFICATE OF CORRECTION

PATENT NO. : 5,084,170
DATED : January 28, 1992
INVENTOR(S) : Leon P. Janik and M. Craig Maxwell It is certified that error appears in the above-indentified patent and that said Letters Patent is hereby corrected as shown below:

Column 10, line 18, after "exterior" insert --surface,--;

line 63, after "fuel" insert --filter assembly--.

Signed and Sealed this

First Day of October, 1996

Attest:

BRUCE LEHMAN

*Attesting Officer*       *Commissioner of Patents and Trademarks*